Oct. 5, 1965 L. VERRONE 3,210,097
TURN SWIVEL ASSEMBLY
Filed June 7, 1962 2 Sheets-Sheet 1
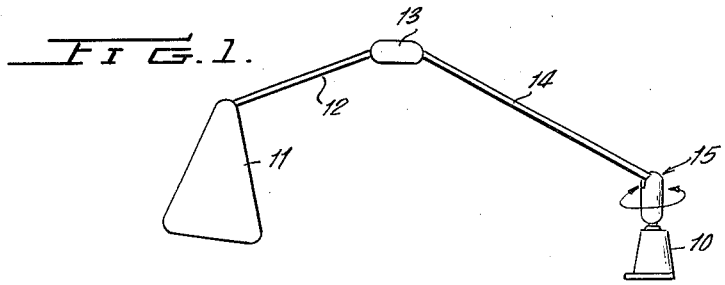
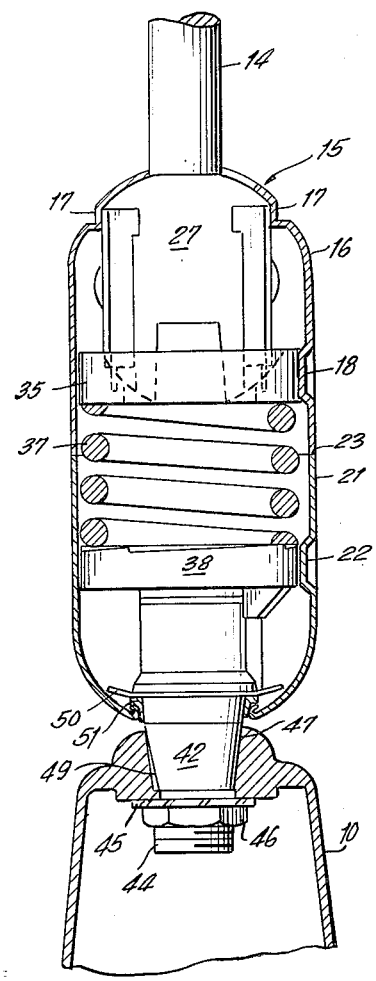
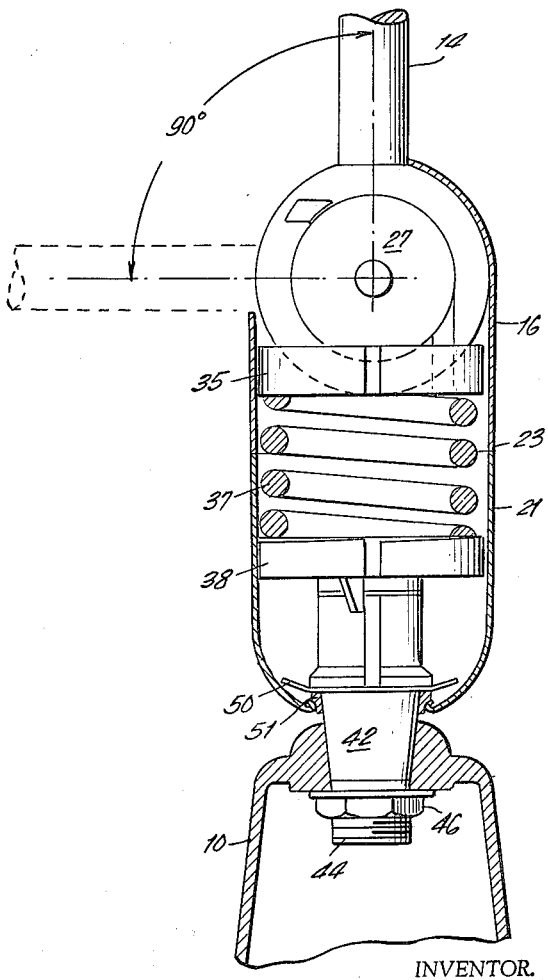
INVENTOR.
LOUIS VERRONE
BY
OSTROLENK, FABER, GERB & SOFFEN
ATTORNEYS

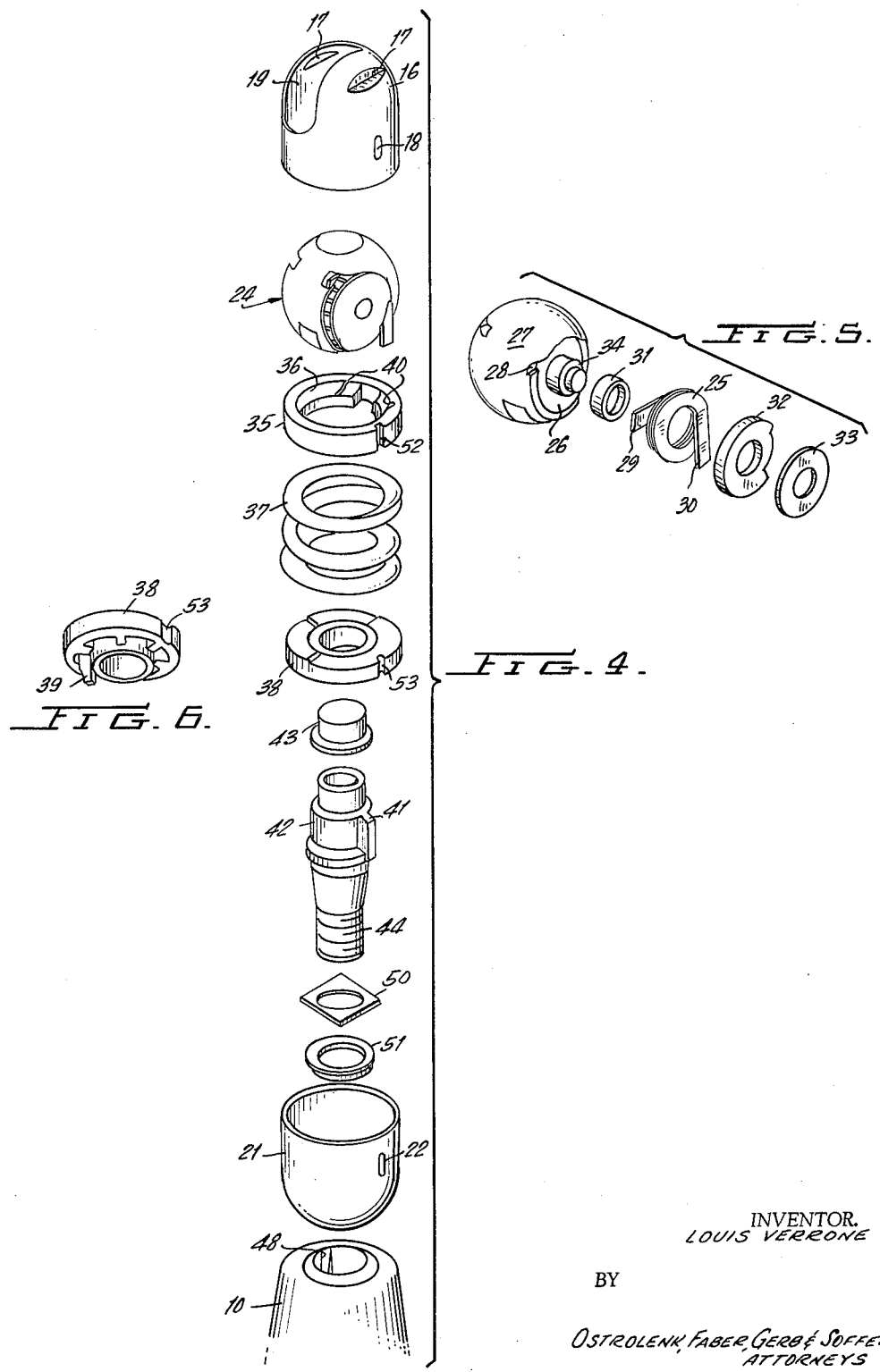

United States Patent Office 3,210,097
Patented Oct. 5, 1965

3,210,097
TURN SWIVEL ASSEMBLY
Louis Verrone, Pearl River, N.Y., assignor to Swivelier Company, Inc., Nanuet, N.Y., a corporation of New York
Filed June 7, 1962, Ser. No. 200,806
2 Claims. (Cl. 285—168)

This invention relates to a turn swivel assembly particularly suitable for use in adjusting the position of a load-bearing arm, such as the arm of a lighting fixture.

Certain lighting fixtures require load-bearing arms which must be continually moved, such as those employed by draftsmen, for assembly lines or in association with machinery. Such lighting fixtures must provide freedom of movement to enable not only the light shade but the arm itself to be adjusted. A two-fold arm movement is required; a vertical movement of 90° with respect to the arm support and a horizontal pivotal movement of approximately 350° with respect to the support.

It is among the objects of the present invention to provide a turn swivel assembly which is simply and ruggedly constructed and which provides the desired movement for a load-bearing arm carried thereby about both the vertical and horizontal axes.

Another object of the invention is to provide such an assembly in which the component parts thereof are readily fixed against rotation with respect to the enclosing housing and are not subject to undesired forces.

Other objects and advantages of this invention will be apparent upon consideration of the following detailed description, taken in connection with the accompanying drawings in which:

FIGURE 1 illustrates a lighting fixture including an embodiment of the turn swivel assembly of this invention;

FIGURE 2 is a vertical section through the turn swivel assembly embodiment shown in FIGURE 1;

FIGURE 3 is a vertical section through the turn swivel assembly, taken at right angles to the section shown in FIGURE 2;

FIGURE 4 is an exploded view of the swivel assembly showing the components thereof in disassembled position;

FIGURE 5 is an exploded view of the swivel ball assembly showing the individual components thereof; and FIGURE 6 is a perspective view of the bearing plate of the turn swivel assembly showing the underside thereof.

In accordance with the invention a turn swivel assembly is provided for supporting a load-bearing arm, (which arm may support a swiveled light shade, for example), which assembly includes an outer housing having a plurality of spaced indentations therein, a counter-balanced swivel ball unit or assembly within the housing, and a cup washer for seating the ball unit. A coil spring exerts a compressive force against the swivel ball unit through the cup washer so as to tend to raise the load-bearing arm, and to provide resistance in lowering the arm; the coil spring is seated in a bearing plate which provides a seat for the turn swivel assembly and is, in turn, supported by an axle mounted on a fixed support.

Keyways are provided in the cup washer and the bearing plate for engaging the respective indentations in the housing to permanently align these components and maintain them against rotation with respect to the housing. In this manner the bearing plate, the coil spring, the cup washer and the swivel ball unit are maintained against rotation with respect to the outer housing, and the creation or torques that interfere with the operation of the turn swivel is minimized, if not prevented.

According to a further feature of the invention the bearing plate of the turn swivel assembly and the axle, upon which the bearing plate is mounted, include engageable stops which limit the horizontal pivotal movement of the turn swivel assembly to approximately 350°, and thereby prevent damage to the wires extending through the turn swivel to the light socket at the opposite end of the load-bearing arm.

Turning now to the specific embodiment of the invention illustrated in the drawings, the lighting fixture schematically shown in FIGURE 1 includes a light shade 11 (which may be swivelly mounted and includes a suitable light source) supported by a load-bearing arm 12 which is connected to a double swivel joint 13 of the type disclosed in United States Patent No. 2,925,294. The joint 13 is mounted on a supporting arm 14, which is in turn supported by an embodiment of the turn swivel assembly of the present invention, indicated generally at 15 in FIGURE 1. The assembly is mounted on a fixed support 10, which may be bolted or otherwise fixed to a wall, desk or other such member.

As shown in FIGURES 2 to 4 inclusive, the turn swivel assembly 15 includes an outer housing comprising a top shell 16 having two large indentations or indents 17, an additional smaller indent 18 and a cut-out 19 for the load-bearing arm 14 to extend through. The housing is completed by a lower shell 21 having a single indent 22 in the side wall thereof. The top shell 16 and the lower shell 21, with the turn swivel components assembled, as described hereinafter, are secured together, as by applying a continuous weld around the abutting edges 23 thereof. By sanding down the joint the weld may be completely concealed and a unitary outer housing thereby provided for the turn swivel assembly.

The housing encloses a counter-balanced swivel ball assembly 24, whose contour matches the interior contour of the top shell 16 to provide a large spherical bearing area which will support the arm 14 of the fixture in any extended position without allowing the arm, and hence the shade 11 at the remote end of the fixture, to fall.

The swivel ball assembly 24 is constructed in the manner described in United States Patent No. 2,925,294 and includes (see FIGURE 5) two counter-balancing torsion springs 25, positioned on opposite sides of the swivel ball unit, which serve to impart an upward force against the load-bearing arm 14 when it is pulled down, thus assuring a constant balanced tension on the arm. This counter-balanced tension provides smooth adjustment of the arm position.

The counter-balancing torsion springs 25 are mounted on each of a pair of opposite sides of the swivel ball assembly 24. For purposes of clarity, the construction of the swivel ball assembly is described below with respect to one of the torsion springs 25; it will be understood that the second torsion spring 25 is mounted on the opposite side of the swivel ball unit in like manner. The torsion spring 25 is mounted within a recess 26 in a swivel ball 27. The ball 27 is provided with a notch 28 for anchoring the upper end 29 of the torsion spring 25. The torsion spring is nested within the recess 26 over a sleeve 31 which takes up the force of the torsion spring as it is flexed, as the flexing of the spring reduces its inside diameter. The assembly is completed by the provision of a cup washer 32 and an outer retaining washer 33, about which the head of a shaft 34 integral with the swivel ball 27 is peened to secure the unit in assembled relation.

The swivel ball assembly 24 is seated on a cup washer 35 having a spherical seating surface 36 which permits sliding movement of the ball assembly 24 when the load-bearing arm 14 thereon is adjusted. In order to prevent the torsion springs 25 from turning freely and thereby not supplying the necessary tension, the lower ends 30 of the springs are held within recesses 40 in the cup washer 35. The cup washer 35 is biased against the swivel ball assembly 24 by a coil spring 37 which provides the necessary force for supporting the load-bearing arm 14 in any extended position.

Disposed beneath the coil spring 37 is a bearing plate 38 (see FIGURES 4 and 6) which has a stop 39 formed integrally with its lower surface; the stop 39 is so located as to engage a mating stop 41 formed on an axle 42, which axle is received in the fixed support 10. The engagement of stops 39 and 41 limit the horizontal pivotal movement of the turn swivel assembly 15 to approximately 350° to prevent the wires extending through the assembly to the light source from twisting or breaking.

A bushing 43, desirably of nylon or other bearing material, is provided between the bearing plate 38 and the axle 42 to provide a smooth turning movement of the bearing plate and the components associated therewith with respect to the axle.

The axle 42 has its lower end threaded at 44 to accept a lock washer 45 and a hexagonal nut 46 (see FIGURES 2 and 3) whereby the axle is secured to the support 10. The support 10 has a tapered passageway 47 of the correct pitch to engage the taper of the axle 42, insuring a firm seat when the axle is secured to the support by the hex nut 46. To correctly position the axle 42 relative to the support 10, a keyway 48 is provided within the passageway 47 to mate with a pline 49 on the axle 42 (see FIGURE 2). A grounding washer 50 is additionally provided to establish electrical contact between the support 10 and the other components of the turn swivel assembly 15 in the event one of the wire leads frays or breaks. Use of the grounding washer 50 is desirable since the support 10 is insulated from the balance of the assembly by the bushing 43 and by a further bushing 51.

In accordance with the invention the components of the turn swivel assembly 15 are aligned with the outer housing defined by the top shell 16 and the lower shell 21 by providing a keyway 52 in the outer peripheral surface of the cup washer 35 which engages the indent 18 in the top shell 16, and by providing a keyway 53 in the outer peripheral surface of the bearing plate 38 to engage the indent 22 in the lower shell 21. These engaging members together with the indents 17, which engage mating portions of the swivel ball 27, maintain the swivel components against rotation and minimize, if not prevent, the production of undesired torques which interfere with the operation of the turn swivel assembly.

When the axle 42 is assembled to the fixed support 10 by means of the lock washer 45 and hex nut 46, the entire turn swivel assembly 15, including the outer housing defined by the top shell 16 and the lower shell 21, rotates about the axle 42.

The coil spring 37 imparts a sufficient downward force on the bearing plate 38 to enable the assembled turn swivel assembly to be self-retaining in any position. Hence when the lighting fixture shown in FIGURE 1 is attached to a drafting board or other supporting surface which can be tilted approximately 15°, the operation of the swivel assembly is not impaired, whereas if a plain friction fit was employed between the axle 42 and the swivel assembly, the fixture would not be self-supporting.

It will be understood that various changes can be made in the embodiment of the turn swivel described above without departing from the scope of the present invention. Hence it will be understood that the shade 11 shown in FIGURE 1 can employ any type of light source or, if desired, objects other than light fixtures can be supported by the turn swivel assembly herein disclosed; in short microphones, magnifying lenses or any objects which frequently require adjustment could be affixed to the load-bearing arm attached to the turn swivel assembly of the present invention. It is therefore intended that all matter contained in the above description or shown in the accompanying drawings shall be interpreted as illustrative and not in a limiting sense.

The embodiments of the invention in which an exclusive privilege or property is claimed are defined as follows:

1. In a light fixture support having a load-bearing arm, a turn swivel assembly for supporting such arm, said assembly including:
   (a) a fixed support,
   (b) an axle mounted against rotation with respect to said support and having a stop member formed integrally therewith,
   (c) an outer housing rotatably affixed to said axle and having a plurality of spaced indentations therein,
   (d) a counter-balanced swivel ball assembly received within said housing,
   (e) a cup washer disposed within said housing and supporting said swivel ball assembly, said cup washer having at least one keyway engaging a first indentation in said housing to maintain said cup washer against rotation with respect to the housing,
   (f) a coil spring disposed within said housing exerting a compressive force against the swivel ball assembly through the cup washer so as to tend to raise the load-bearing arm and to provide resistance to lowering said arm,
   (g) a bearing plate disposed within said housing supporting said coil spring and having a keyway engaging a second indentation in said housing to maintain said bearing plate against rotation with respect to the housing, said bearing plate being rotatably seated on said axle and having a depending stop engageable with the stop member on said axle to limit rotation of the turn swivel assembly relative to said axle to approximately 350°.

2. The turn swivel assembly as defined in claim 1, including a keyway in said support and a mating spline on said axle receivable in said keyway to maintain the axle against rotation with respect to said support.

References Cited by the Examiner
UNITED STATES PATENTS

| | | |
|---|---|---|
| 2,419,849 | 4/47 | Morris. |
| 2,448,494 | 8/48 | Moser _____ 287—87 |
| 2,472,624 | 6/49 | Schwartz _____ 287—87 |
| 2,887,329 | 5/59 | Blakely _____ 285—282 |
| 2,925,294 | 2/60 | Schwartz _____ 287—87 |

CARL W. TOMLIN, *Primary Examiner.*